United States Patent [19]

Hibst et al.

[11] Patent Number: 4,650,597
[45] Date of Patent: Mar. 17, 1987

[54] PREPARATION OF FINELY DIVIDED ISOTROPIC COBALT-CONTAINING FERRITE POWDER

[75] Inventors: Hartmüt Hibst, Ludwigshafen; Helmut Jakusch, Frankenthal, both of Fed. Rep. of Germany

[73] Assignee: BASF Aktiengesellschaft, Fed. Rep. of Germany

[21] Appl. No.: 731,720

[22] Filed: May 8, 1985

[30] Foreign Application Priority Data

May 9, 1984 [DE] Fed. Rep. of Germany ....... 3416988

[51] Int. Cl.$^4$ ............................................. C01G 49/08
[52] U.S. Cl. ................................. 252/62.56; 423/594; 252/519
[58] Field of Search ...................... 423/594; 252/62.56, 252/62.6, 519

[56] References Cited

U.S. PATENT DOCUMENTS 3,827,210 7/1974 Iwase et al. ..................... 252/62.64

OTHER PUBLICATIONS

T. Sato, M. Sugihara, review of the Electrical Communication Laboratory vol. 11, Nos. 1-2, Jan.-Feb. 1963 (1-2) (26-36).

R. E. Vanleerberghe, E. De Grave, G. Robbrecht, Journal Magnetism, Material 15-18 (1980) 1117-1118.

W. J. Schuele, V. D. Deetscreek, Journal of Applied Physics 32 Suppl. (3), 1961 (235-326).

*Primary Examiner*—Josephine L. Barr
*Attorney, Agent, or Firm*—Keil & Weinkauf

[57] ABSTRACT

Finely divided ferrite powder of the general formula $$Co_xFe_{3-x}O_{4.5-0.5\,x}$$

where x is from greater than zero to one, having an essentially isotropic particle shape, is prepared by oxidation of ferrite powder of the composition $Co_xFe_{3-x}O_4$, where x has the same limits, with an oxygen-containing gas at from 150° to 500° C.

3 Claims, No Drawings

PREPARATION OF FINELY DIVIDED ISOTROPIC COBALT-CONTAINING FERRITE POWDER

The present invention relates to a process for the preparation of finely divided ferrite powder of the general formula $$Co_xFe_{3-x}O_{4.5-0.5x}$$

where x is from greater than zero to one, having an essentially isotropic particle shape, by oxidation of ferrite powder of the composition $Co_xFe_{3-x}O_4$, where x has the same limits, with an oxygen-containing gas at from 150° to 500° C.

It is known that the coercive force of isotropic ferrite powder increases with increasing cobalt content x, so that the coercive force of a ferrite pigment can be set by means of the cobalt content. Furthermore, it is known that the dry oxidation of cobalt-containing magnetite powder of the composition $Co_xFe_{3-x}O_4$ [$Co(II)Fe(II)_{1-x}Fe(III)_2O_4$], where $0<x\leq1$, to cobalt-containing $\gamma$-Fe(III) oxide of the composition $Co_xFe_{3-x}O_{4.5-0.5x}$ [$Co_x(II)Fe_{3-x}(III)O_{4.5-0.5x}$], where $0<x\leq1$, results in an increase in the coercive force, in the specific remanent magnetization and in the relative remanence $m_r=M_r/M_s$, and a decrease in the switching field distribution. However, the pigment particle diameter, the BET specific surface area and the isotropic particle shape remain virtually unchanged during the dry oxidation.

Ferrite powders having the composition $Co_xFe_{3-x}O_{4.5-0.5x}$ are important for the production of magnetic recording media, in particular isotropic magnetic media for combined longitudinal/vertical recording. The magnetic particles required for this purpose must exhibit good dispersibility, a high specific remanent magnetization, a high relative remanence $m_r$ (=$M_r/M_s$), a low switching field distribution, little temperature dependence of the magnetic properties, low magnetostriction and a narrow particle size spectrum and must be very finely divided.

Cobalt-containing magnetites having the composition $Co_xFe_{3-x}O_4$ ($0<x\leq1$) have hitherto been prepared by two different methods.

The neutralization method starts from a coprecipitate having a pH of 11–13, this coprecipitate being prepared by combining an aqueous alkali metal hydroxide solution, a Co salt solution, an Fe(II) salt solution and an Fe(III) salt solution. When the coprecipitate is heated under a non-oxidizing protective gas, e.g. nitrogen or argon, extremely finely divided Co-doped magnetite which has the composition $Co_xFe_{3-x}O_4$ [$Co(II)_xFe(II)_{1-x}Fe(III)_2O_4$], where $0<x\leq1$, is obtained, the particles having an isotropic shape. In the neutralization method, on the one hand, the Fe(III)/Fe(II) ratio in the coprecipitate is the same as that in the Co-doped magnetite obtained and therefore remains constant during the reaction, and on the other hand, the pH of the reaction mixture remains unchanged during the reaction. The resulting ferrite powders are extremely finely divided and, depending on the reaction conditions, have particle diameters of about 60–150 Å; the BET specific surface area of the pigments is from 100 to 300 m²/g. At room temperature, these extremely finely divided products prepared in a strongly alkaline medium at pH 11–13 have a relatively high content of superparamagnetic particles and a low relative remanence $m_r$ (=$M_r/M_s$) (R. E. VANDENBERGHE, R. VANLEERBERGHE, E. DE GRAVE and G. ROBBRECHT, J. Magn. Magn. Mater. 15–18(1980), 1117–1118). They are therefore unsuitable as magnetic pigments for magnetic recording. If the neutralization method is carried out using a coprecipitate whose pH is less than 10.5, cobalt ferrite is obtained in X-ray amorphous form, the product even being completely superparamagnetic (T. SATO, M. UGIHARA and M. SAITO, Review of the Electrical Communication Laboratory 11(1–2) (1963), 26–36). Ferrite powders having larger particle diameters and good ferrimagnetic properties can be synthesized only by means of an elaborate hydrothermal aftertreatment of the cobalt ferrite powder at above 100° C. and under superatmospheric pressure (W. J. SCHUELE and V. D. DEETSCREEK, J. Appl. Phys. 32Suppl. (3) (1961) 235 S–236 S). Another disadvantage of the neutralization method is the fact that the extremely finely divided pigments obtained in colloidal form are difficult to separate off by filtration, and washing of the filter cake is tedious. Moreover, drying of the precipitated powder results in extremely hard masses, which cannot be converted into readily dispersible ferrite powders by pulverization.

The second method, the oxidation process, starts from a coprecipitate which has a specific pH and is prepared by combining an aqueous alkali metal hydroxide solution, a Co salt solution and an Fe(II) salt solution. This is heated up, and oxidized with an oxidizing gas, for example air, until a cobalt-containing magnetite which has isotropic particles and the composition $Co_xFe_{3-x}O_4$ [$Co(II)_xFe(II)_{1-x}Fe(III)_2O_4$], where $0<x\leq1$, is obtained. In the oxidation process, the starting material used is an Fe(III)-free coprecipitate. In the reaction, some of the Fe(II) in the coprecipitate is oxidized to the Fe(III) present in the ferrite powder obtained. In this procedure, the initial pH of the coprecipitate is shifted to lower values, i.e. into the acidic range, unless alkali metal hydroxide solution is added continuously during the reaction.

It has been disclosed (U.S. Pat. No. 3,822,210) that the fineness of the resulting ferrite powder particles can be varied, to a limited extent, by appropriate choice of the reaction parameters, such as pH and reaction temperature. Moreover, under certain reaction conditions, the cobalt concentration x has an effect on the resulting fineness of the pigment particles. However, we have also found that, using the oxidation process, it is extremely difficult to prepare cobalt-containing magnetite powders having a particle diameter of less than 0.15 μm and a BET specific surface area greater than 12 m²/g. When technical-grade iron(II) chloride solutions are used, particular problems are encountered in the production of very finely divided pigments, a particular disadvantage in this respect arising in the preparation of magnetic recording media having a very smooth surface and a high signal-to-noise ratio.

It is an object of the present invention to provide an economical process which permits the preparation of isotropic cobalt-containing magnetite and the conversion thereof into cobalt-containing $\gamma$-Fe$_2$O$_3$ which is very finely divided but still exhibits high relative remanence.

We have found that this object is achieved, and that finely divided ferrite powders of the general formula $$Co_xFe_{3-x}O_{4.5-0.5x}$$

where x is from greater than zero to 1, having an essentially isotropic particle shape, can be prepared by oxidation of ferrite powder of the composition $Co_xFe_{3-x}O_4$ where x has the same limits, with an oxygen-containing gas at from 150° to 500° C., if the $Co_xFe_{3-x}O_4$ intermediate is produced by passing an oxygen-containing gas into a coprecipitate prepared from an aqueous alkali metal hydroxide solution, a cobalt salt solution, an iron(II) salt solution and an iron(III) salt solution, the ratio of iron(III) ions to iron(II) ions in the coprecipitate being lower than that in the resulting ferrite powder of the composition $Co_xFe_{3-x}O_4$.

The process according to the invention differs from the neutralization method in that, in contrast to the latter, the Fe(III)/Fe(II) ratio in the initial coprecipitate does not correspond to that in the resulting ferrite powder of the composition $Co_xFe_{3-x}O_4$ ($0<x\leq 1$) but is always lower. Moreover, the novel process involves the chemical reaction of gaseous oxygen, whereas the neutralization method is carried out under a protective gas and hence in the absence of oxidizing gases. Furthermore, the process according to the invention gives pigments having particularly good ferromagnetic properties if oxidation is carried out at a pH of from 6.0 to 10.0, i.e. in a pH range in which the neutralization method gives completely X-ray amorphous and superparamagnetic products. Since the novel process gives pigments which are coarser than those obtained by the neutralization method, no filtration and washing problems arise in the novel process, in contrast to the neutralization method.

The novel process differs from the oxidation process in that the latter starts from a coprecipitate which contains alkali metal hydroxide, a Co(II) salt and an Fe(II) salt but no Fe(III) salt, whereas the novel process starts from a coprecipitate containing an Fe(III) salt. In carrying out the novel process, we have found, surprisingly, that, as the Fe(III) content of the coprecipitate increases, so does the fineness of the particles of the resulting cobalt-containing magnetite $Co_xFe_{3-x}O_4$ ($0<x\leq 1$) and hence that of the particles of the cobalt-containing $\gamma$-$Fe_2O_3$ [$Co_xFe_{3-x}O_{4.5-0.5x}$]; $0<x\leq 1$) obtained after the oxidation. As the Fe(III) content of the coprecipitate increases, the particle diameter decreases from about 0.15 μm to about 0.02 μm. The corresponding pigments have BET specific surface areas of about 12–100 m²/g. Hence, the novel process gives pigments which are substantially more finely divided than those which can be obtained by the oxidation process. Because the Fe(III) content of the initial coprecipitate is not excessively high, not only is the fineness of the pigment particles increased but, at a constant Co/Fe ratio, the coercive force of the cobalt-containing iron-(III) oxide pigment ([$Co_xFe_{3-x}O_{4.5-0.5x}$]; $0<x\leq 1$) obtained after the oxidation is also increased in an unforseeable and surprising manner. The optimum Fe(III) content, in the initial coprecipitate, which is required to achieve a maximum increase in $H_c$, and the maximum $H_c$ increase achievable, are dependent on the selected Co/Fe ratio. Hence, in order to obtain a $Co_xFe_{3-x}O_{4.5-0.5x}$ pigment having a specific coercive force, the Co content required is lower if this pigment is prepared by the novel process than if it is prepared by the conventional oxidation process, apart from the fact that the novel process gives pigments which are more finely divided. The lower Co content required in the pigment has economic advantages and, as is well known, furthermore reduces the magnetostriction and the temperature dependence of the magnetic properties. Moreover, the $Co_xFe_{3-x}O_{4.5-0.5x}$ pigments prepared by the novel process have the advantage that they exhibit a lower switching field distribution than the pigments prepared by the oxidation process. The resulting pigments unexpectedly also exhibit a narrower particle size distribution than the magnetic pigments obtained by the conventional oxidation process, the narrow particle size distribution being in keeping with the higher coercive force and the lower switching field distribution.

The isotropic ferrimagnetic cobalt-containing iron oxides prepared according to the invention unexpectedly exhibit advantageous properties when used as magnetic materials for the production of magnetic recording media. In order to produce magnetic layers, the ferrimagnetic iron oxide is dispersed in a polymeric binder, useful binders for this purpose being known compounds, such as homo- and copolymers of polyvinyl derivatives, polyurethanes, polyesters and the like. The binders are used in solution in suitable organic solvents, which may or may not contain further additives. The magnetic dispersions are applied to rigid or flexible bases, such as disks, films or cards.

For the same Co/Fe ratio, the isotropic ferrimagnetic Co-doped iron oxides prepared according to the invention surprisingly differ substantially from the conventional isotropic cobalt-containing iron oxides obtained by the neutralization method in that they possess better ferrimagnetic properties, in particular a higher coercive force, specific remanent magnetization and relative remanence, and from the conventional cobalt-containing iron oxides obtained by the oxidation process in that they are more finely divided and have a higher coercive force and a narrower particle size distribution. These improvements in the magnetic material also have a very marked effect on the magnetic recording media produced with it. For example, the great fineness of the pigments prepared according to the invention result in magnetic media exhibiting a very smooth surface and a low weighted background noise ($RG_A$). In addition to the desirable low weighted background noise, the novel isotropic cobalt-containing iron oxides result in an increase, and hence an improvement, in the signal to print-through ratio (Ko). This is completely unexpected and surprising, since it is known that an increase in the fineness of the pigment particles normally brings about a reduction, and hence a deterioration, in the signal to print-through ratio. The improvement in the latter must be attributable to the narrower particle size spectrum of the novel pigments.

The Examples which follow illustrate the invention. Examples 1, 4 and 7 illustrate the preparation of cobalt-containing iron oxide by the conventional oxidation process, while Examples 2, 3, 5, 6, 8 and 9 illustrate the preparation of cobalt-containing iron oxide by the novel process. Example 10 describes the preparation of a magnetic recording medium using cobalt-containing iron oxide obtained by the conventional oxidation process. Examples 11 and 12 describe the preparation of magnetic recording media according to the invention.

EXAMPLE 1

In a 5 l stirred vessel, aqueous NaOH solution and water were added to a solution of 50.19 g of $CoCl_2.6H_2O$ and 620.29 g of $FeCl_2.4H_2O$ in 1.6 l of $H_2O$, while stirring and passing in 200 l/h of pure nitrogen, until the pH had reached 7.5 and the total volume was 4.0 l.

Thereafter, the coprecipitate was heated to 80° C., after which the stream of nitrogen was stopped and instead 200 l/h of air were passed into the coprecipitate. The pH of the reaction mixture was kept constant at the set value of 7.5 by continuously adding a 2.5 molar sodium hydroxide solution. Air was passed in until the Fe(II) content of the reaction mixture remained constant. After the dispersion had cooled, the resulting ferrite powder was filtered off, washed thoroughly and dried. The resulting cobalt-containing magnetite which had the composition $Co_{0.19}Fe_{2.81}O_4$ and an isotropic particle shape was then oxidized for one hour at 300° C. with 100 l/h of air in a rotating quartz flask. The following powder properties were measured on the resulting isotropic cobalt-containing iron(III) oxide of the composition $Co_{0.19}Fe_{2.81}O_{4.405}$: $H_c=66.9$ kA/m, $M_r/\rho=62$ $nTm^3/g$, $m_r=0.82$, SFD (switching field distribution)$=0.43$, and $S_{N2}$(BET specific surface area)$=12.0$ $m^2/g$.

EXAMPLE 2

In a 5 stirred vessel, 200 l/h of pure nitrogen were passed into a stirred solution of 50.19 g of $CoCl_2.6H_2O$, 575.97 g of $FeCl_2.4H_2O$ and 60.01 g of $FeCl_3.6H_2O$ in 2.2 l of $H_2O$, further treatment being carried out as described in Example 1. The reaction time at 80° C. and pH 7.5 was 3 hours.

The following powder properties were measured on the resulting isotropic cobalt-containing iron(III) oxide of the composition $Co_{0.19}Fe_{2.81}O_{4.405}$: $H_c=76.6$ kA/m, $M_r/\rho=54$ $nTm^3/g$, $m_r=0.78$, SFD$=0.41$ and $S_{N2}=20.0$ $m^2/g$.

EXAMPLE 3

In a 5 l stirred vessel, 200 l/h of pure nitrogen were passed into a stirred solution of 50.19 g of $CoCl_2.6H_2O$, 531.84 g of $FeCl_2.4H_2O$ and 120.01 g of $FeCl_3.6H_2O$ in 2.2 l of $H_2O$, further treatment being carried out as described in Example 1. The reaction time at 80° C. and pH 7.5 was 3 hours.

The following powder properties were measured on the resulting isotropic cobalt-containing iron(III) oxide of the composition $Co_{0.19}Fe_{2.81}O_{4.405}$: $H_c=67.4$ kA/m, $M_r/\rho=45$ $nTm^3/g$, $m_r=0.70$, SFD$=0.41$ and $S_{N2}=23.0$ $m^2/g$.

EXAMPLE 4

The experiment described in Example 1 was repeated, but, instead of 80° C., a reaction temperature of 90° C. was employed.

The following powder properties were measured on the resulting isotropic cobalt-containing iron(III) oxide of the composition $Co_{0.19}Fe_{2.81}O_{4.405}$: $H_c=59.5$ kA/m, $M_r/\rho=65$ $nTm^3/g$, $m_r=0.81$, SFD$=0.44$ and $S_{N2}=9.6$ $m^2/g$.

EXAMPLE 5

The experiment described in Example 2 was repeated but, instead of 80° C., a reaction temperature of 90° C. was employed, as in Example 4.

The following powder properties were measured on the resulting isotropic cobalt-containing iron(III) oxide of the composition $Co_{0.19}Fe_{2.81}O_{4.405}$: $H_c=64.3$ kA/m, $M_r/\rho=52$ $nTm^3/g$, $m_r=0.75$, SFD$=0.42$ and $S_{N2}=18.0$ $m^2/g$.

EXAMPLE 6

The experiment described in Example 3 was repeated, but, instead of 80° C., a reaction temperature of 90° C. was employed, as in Example 4.

The following powder properties were measured on the resulting isotropic cobalt-containing iron(III) oxide of the composition $Co_{0.19}Fe_{2.81}O_{4.405}$: $H_c=59.9$ kA/m, $M_r/\rho=46$ $nTm^3/g$, $m_r=0.70$, SFD$=0.44$ and $S_{N2}=25.8$ $m^2/g$.

EXAMPLE 7

In a 5 l stirred vessel, a stirred solution of 50.19 g of $CoCl_2.6H_2O$ in 1.2 l of $H_2O$ was mixed with 974.01 ml of a technical-grade iron(II) chloride solution having a concentration of 40.6 g of $FeCl_2$ per 100 ml, 200 l/h of pure nitrogen being passed in. Aqueous NaOH solution and water were added to the resulting solution until the pH had reached 6.8 and the total volume was 4.0 l. The further procedure was as described in Example 4. The reaction time at 90° C. and pH 6.8 was 5 hours.

The following powder properties were measured on the resulting isotropic cobalt-containing iron(III) oxide of the composition $Co_{0.19}Fe_{2.81}O_{4.405}$: $H_c=53.9$ kA/m, $M_r/\rho=58$ $nTm^3/g$, $m_r=0.79$, SFD$=0.53$ and $S_{N2}=8.7$ $m^2/g$.

EXAMPLE 8

In a 5 l stirred vessel, a stirred solution of 50.19 g of $CoCl_2.6H_2O$ in 1.2 l of $H_2O$ was mixed with 972.4 ml of a technical-grade iron(II) chloride solution having a concentration of 39.2 g of $FeCl_2$ per 100 ml, and with 27.09 ml of a technical-grade iron(III) chloride solution having a concentration of 66.48 g of $FeCl_3$ per 100 ml, 200 l/h of pure nitrogen being passed in. The resulting solution was treated further as described in Example 7. The reaction time at 90° C. and pH 6.8 was 4 hours.

The following powder properties were measured on the resulting isotropic cobalt-containing iron(III) oxide of the composition $Co_{0.19}Fe_{2.81}O_{4.405}$: $H_c=70.1$ kA/m, $M_r/\rho=53$ $nTm^3/g$, $m_r=0.75$, SFD$=0.50$ and $S_{N2}=16.0$ $m^2/g$.

EXAMPLE 9

In a 5 stirred vessel, a stirred solution of 50.19 g of $CoCl_2.6H_2O$ in 1.2 l of $H_2O$ was mixed with 936.92 ml of a technical-grade iron(II) chloride solution having a concentration of 39.2 g of $FeCl_2$ per 100 ml, and with 54.17 ml of a technical-grade iron(III) chloride solution having a concentration of 66.48 g of $FeCl_3$ per 100 ml, 200 l/h of pure nitrogen being passed in. The resulting solution was treated further as described in Example 7. The reaction time at 90° C. and pH 6.8 was 4 hours.

The following powder properties were measured on the resulting isotropic cobalt-containing iron(III) oxide of the composition $Co_{0.19}Fe_{2.81}O_{4.405}$: $H_c=71.6$ kA/m, $M_r/\rho=47$ $nTm^3/g$, $m_r=0.71$, SFD$=0.46$ and $S_{N2}=21.3$ $m^2/g$.

EXAMPLE 10

In order to produce a magnetic recording medium, a mixture having the following composition was prepared in a 250 $cm^3$ glass flask:

50 g of a magnetic pigment prepared as described in Example 1 and having a BET specific surface area of 12.0 $m^2/g$, 18.8 g of a solvent mixture consisting of equal amounts of tetrahydrofuran and dioxane, 12.5 g of a 20% strength solution of an 80:10:10 copolymer of vinyl chloride, dimethyl maleate and diethyl maleate, having a K Value of 60 in the above solvent mixture, 12.8 g of a 13% strength solution of a polyesterpolyurethane, having a K value of 60 and prepared from a polyester obtained from butanediol and adipic acid, butanediol, trimethylolpropane and diphenylmethane diisocyanate, likewise in the above solvent mixture, and 3 g of a commercial anionic dispersant based on an oxyethylated phosphate.

This mixture was dispersed for 3 hours in a shaken ball mill containing 100 cm$^3$ of steel balls with a diameter of 2 mm. 37.85 g of the binder solution mentioned in the preceding paragraph, 5 g of the above solvent mixture and 0.5 g of isostearic acid were then added, and dispersing was continued for a further 0.5 hour. The balls were separated off, the dispersion was filtered through a filter having 5 μm pores and then applied to a 12 μm thick polyethylene terephthalate film by means of a knife coater, no magnetic orientation of the particles being subsequently effected. The coated film was then dried and calendered by passing it between rollers heated to 70° C. The thickness of the resulting magnetizable layer was 5 μm.

A 3.81 mm wide piece of tape was produced, and this was tested on a commercial recorder, using a head with a 2.5 μm gap width, according to DIN 45,401, 45,403 and 45,512, sheet 12. For a residual induction of the tape of 141 mT, a signal to print-through ratio (Ko) of −5.8 dB and a weighted background noise ($RG_A$) of −0.2 dB were measured against an IEC II reference tape.

EXAMPLE 11

The procedure described in Example 10 was followed, except that a magnetic pigment prepared according to the invention as described in Example 2, and having a specific surface area of 20.0 m$^2$/g was used. The results, measured in the same manner, are as follows:

Residual induction of the tape = 123 mT,
Ko = +8 dB
$RG_A$ = +3 dB

EXAMPLE 12

The procedure described in Example 10 was followed, except that a magnetic pigment prepared according to the invention as described in Example 3, and having a specific surface area of 23.0 m$^2$/g, was used. The results, measured in the same manner, are as follows:

Residual induction of the tape = 113 mT,
Ko = +8.3 dB,
$RG_A$ = +5.1 dB.

We claim:

1. A process for the preparation of a finely divided ferrite powder of the formula $$Co(II)_x Fe(III)_{3-x} O_{4.5-0.5x}$$

where x is from greater than zero to 1, having an essentially isotropic particle shape, by oxidation of ferrite powder of the composition $Co(II)_x Fe(II)_{1-x} Fe(III)_2 O_4$, where x has the same limits, with an oxygen-containing gas at from 150° to 500° C., wherein the $Co(II)_x Fe(II)_{1-x} Fe(III)_2 O_4$ intermediate is produced by passing an oxygen-containing gas into a coprecipitate prepared from an aqueous solution of an alkali metal hydroxide, a cobalt salt, an iron(II) salt and an iron(III) salt at a constant pH from 6.0 to 10.0, the ratio of iron(III) ions to iron(II) ions in the coprecipitate being lower than that in the resulting ferrite powder of the composition $Co(II)_x Fe(II)_{1-x} Fe(III)_2 O_4$.

2. The process of claim 1, wherein sodium hydroxide or potassium hydroxide is used as the alkali metal hydroxide.

3. The process of claim 1, wherein the oxygen-containing gas that is passed into the coprecipitate is air.

* * * * *